(12) United States Patent
Nylund

(10) Patent No.: US 6,816,563 B2
(45) Date of Patent: Nov. 9, 2004

(54) SPACER AND FUEL ASSEMBLY FOR A NUCLEAR REACTOR

(75) Inventor: Olov Nylund, Västerås (SE)

(73) Assignee: Westinghouse Atom AB, Vasteras (CH)

( * ) Notice: Subject to any disclaimer, the term of this patent is extended or adjusted under 35 U.S.C. 154(b) by 0 days.

(21) Appl. No.: 10/312,867

(22) PCT Filed: Jun. 28, 2001

(86) PCT No.: PCT/SE01/01491

§ 371 (c)(1),
(2), (4) Date: Jan. 2, 2003

(87) PCT Pub. No.: WO02/03394

PCT Pub. Date: Jan. 10, 2002

(65) Prior Publication Data

US 2003/0147487 A1 Aug. 7, 2003

(30) Foreign Application Priority Data

Jul. 3, 2000 (SE) .............................................. 0002513

(51) Int. Cl.[7] .............................. G21C 3/18; G21C 3/34
(52) U.S. Cl. ...................................................... 376/439
(58) Field of Search ......................................... 376/439

(56) References Cited

U.S. PATENT DOCUMENTS

| | | | | |
|---|---|---|---|---|
| 3,749,640 A | * | 7/1973 | Isreal | 376/439 |
| 3,933,584 A | * | 1/1976 | Litt | 376/439 |
| 4,125,434 A | | 11/1978 | Frömel et al. | |
| 5,110,539 A | * | 5/1992 | Perrotti et al. | 376/439 |
| 5,112,571 A | | 5/1992 | Orii et al. | |
| 5,247,551 A | * | 9/1993 | van Swam | 376/439 |
| 5,259,009 A | * | 11/1993 | Patterson et al. | 376/439 |
| 5,265,140 A | * | 11/1993 | Perrotti | 376/439 |
| 5,272,741 A | * | 12/1993 | Masuhara et al. | 376/439 |
| 5,327,472 A | * | 7/1994 | Kraemer et al. | 376/439 |
| 5,440,599 A | | 8/1995 | Rodack et al. | |
| 5,530,729 A | * | 6/1996 | Gustafsson | 376/439 |
| 5,666,389 A | | 9/1997 | Andersson et al. | |
| 6,278,758 B1 | * | 8/2001 | Imaizumi et al. | 376/439 |
| 6,415,011 B1 | | 7/2002 | Helmersson | |
| 6,507,630 B1 | * | 1/2003 | Smith et al. | 376/439 |

FOREIGN PATENT DOCUMENTS

| | | | | |
|---|---|---|---|---|
| DE | 2157742 | * | 5/1973 | 376/439 |
| DE | 2602124 | | 5/1977 | |
| DE | 19944233 | | 3/2000 | |
| EP | 0291748 | | 11/1988 | |
| EP | 0399182 | | 11/1990 | |
| EP | 0534254 | | 3/1993 | |
| JP | 0203893 | * | 10/1985 | 376/439 |
| SE | 505144 | | 6/1997 | |
| SE | 510816 | | 6/1999 | |
| SE | 9803177-6 | | 3/2000 | |
| WO | 93/24933 | | 12/1993 | |

* cited by examiner

Primary Examiner—Harvey E. Behrend
(74) Attorney, Agent, or Firm—Swidler Berlin Shereff Freidman, LLP

(57) ABSTRACT

The invention concerns a spacer and a fuel assembly for a nuclear reactor. The spacer has a plurality of cells (10) for holding elongated elements. The cells (10) are defined by a plurality of side portions (12). At least one of said cells (10) has at least one side portion (12) from which a flow-influencing member (20) is formed in that it is folded out from the side portion (12). The side portion (12) from which the flow-influencing member (20) is folded out comprises a first (22) and a second (24) edge surface which are connected to each other and which correspond to the directions of a first (26) and a second (28) edge of said flow-influencing member (20) in a non folded out state of the flow-influencing member (20). The first edge surface (22) has an extension in at least a first direction (14) in which a cooling medium is intended to flow. The second edge surface (24) has an extension in a direction which is perpendicular to said first direction (14).

11 Claims, 7 Drawing Sheets

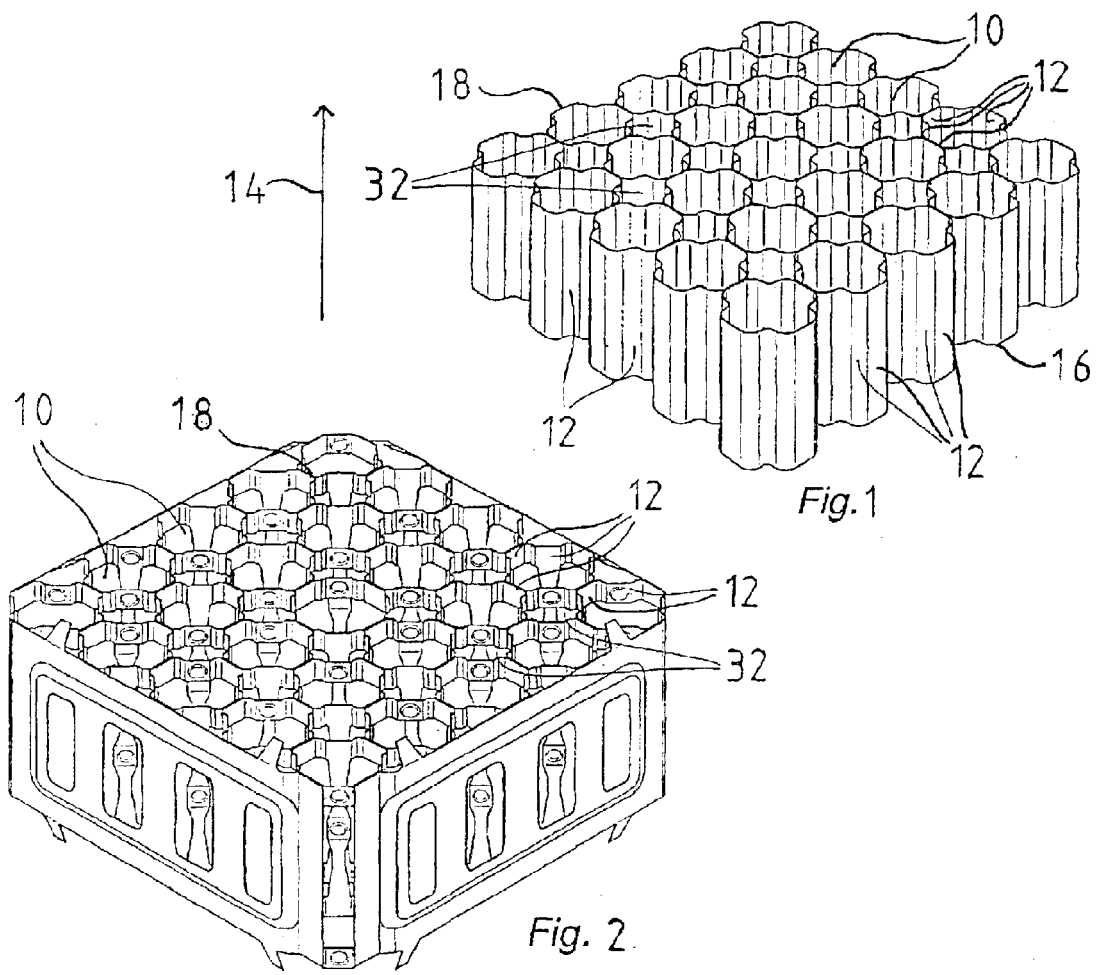
Fig. 1
Fig. 2
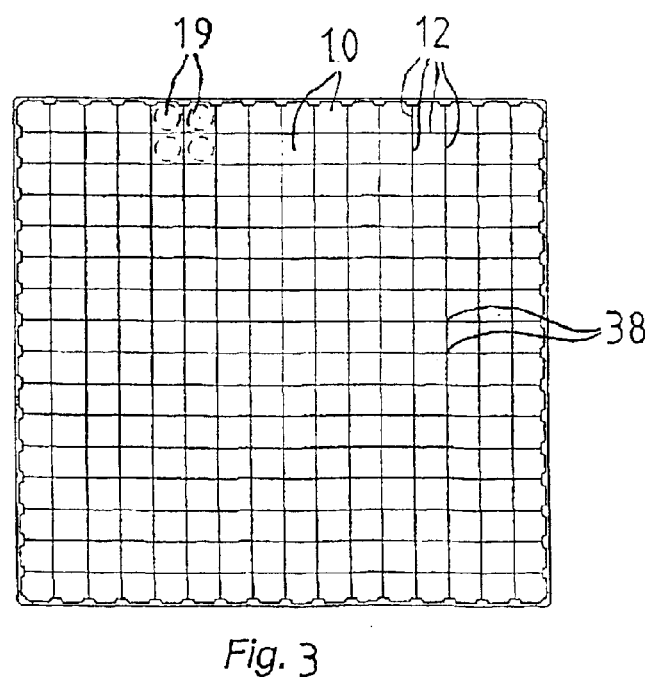
Fig. 3

SPACER AND FUEL ASSEMBLY FOR A NUCLEAR REACTOR

BACKGROUND OF THE INVENTION AND PRIOR ART

The present invention concerns a spacer and a fuel assembly for a nuclear reactor, preferably for a nuclear light water reactor. The spacer is designed such that it forms a plurality of cells for holding parallel elongated elements which extend through the cells or for allowing these elements to pass through the cells. Each of said cells is defined by a plurality of side portions which together surrounds one of said elongated elements when such an element is arranged such that it extends through the spacer. The spacer is designed to be arranged in a nuclear reactor such that said cells, and thereby said elongated elements, extend in essentially a first direction in which a cooling medium is intended to flow. Each cell thus comprises a first end which is intended to be positioned upstream with regard to said first direction and a second end which is intended to be positioned downstream with regard to said first direction. For at least one of said cells it is the case that at least one of said side portions which define the cell comprises at least one flow-influencing member which is formed by a part of said side portion and which is folded out from the side portion. Said side portion from which said flow-influencing member is folded out comprises a first and a second edge surface which are connected to each other, which edge surfaces have different principal directions of extension which correspond to the directions of a first and a second edge of said flow-influencing member in a non folded out state of the flow-influencing member.

A spacer of this kind is known from U.S. Pat. No. 5,112,571. The purpose with said flow-influencing member is to influence the flow of the cooling medium which flows through the spacer in order to improve the cooling of the parallel elongated elements which consist of fuel rods. The above mentioned flow-influencing member will below also be called fin. The mentioned U.S. patent document shows that the cells have a plurality of fins which are folded out from the side portions of the cells. The document shows one embodiment where a cut which extends in the vertical direction has been done from the upper edge of the cell. A part of the cell has thereby been folded out. The side portion from which the fin has been folded out thus comprises only one edge surface which extends essentially vertically. The document also shows a second embodiment where the fin is positioned further down in the cell. The side portion thereby comprises an upper edge surface which extends essentially horizontally and a second edge surface which starts from the upper edge surface and extends essentially vertically. The folded out fins thus have an essentially triangular shape.

U.S. Pat. No. 5,440,599 shows folded out fins which are arranged on top of the spacer itself, i.e. above the cells themselves which hold the elongated elements in position.

SE-C2-510 816 shows spacers where fins have been folded out from the spacer cell after that one or two vertical cuts have been made from the upper edge from the spacer cell.

The Swedish patent application 9803177-6, which has been made public, shows spacers with cells of an open construction where fins of essentially triangular shape are arranged.

It should be noted that it exist nuclear reactors of different kinds, for example so-called boiling water reactors and so-called pressure water reactors. In such nuclear reactors nuclear fuel is usually arranged in fuel rods. A plurality of such fuel rods are usually arranged parallel to each other in a fuel assembly. In order to hold the fuel rods at determined distances from each other, a fuel assembly comprises a plurality of spacers. FIGS. 1, 2 and 3 show different kinds of known spacers. Such spacers comprise a plurality of cells 10 through which the fuel rods are intended to extend. The cells 10 are arranged parallel to each other. Usually the cells 10, and thus the fuel rods, extend in the vertical direction. The spacer, and each cell 10 in the spacer, thus has a first end 16 which is located at the bottom and a second end 18 which is located at the top. A cooling medium, usually water, is intended to flow upwards through the fuel assembly. A main flow direction which thus is parallel to the extension of the fuel rods and the cells 10 is marked with 14 in FIG. 1. FIG. 1 shows a kind of spacer with sleeve-shaped cells 10. In the shown case, the cells 10 are cornered in order to hold the fuel rods in position with a spring force. The spacer of the kind that is shown in FIG. 1 will below be called a spacer with sleeve-shaped cells 10. Such a kind of spacer may also have cells 10 of essentially circular shape. The sleeve-shaped cells 10 are preferably welded together in order to form a spacer.

FIG. 2 shows a kind of spacer where the cells 10 are formed as relatively open elements with support points and resilient members which are arranged to hold the fuel rods in position. This kind of spacer will below be called a cell-spacer. Between the cells 10 in those kinds of spacers which are shown in FIG. 1 and in FIG. 2 a number of flow channels 32 are formed through which a cooling medium may flow.

In FIG. 3 another kind of spacer is shown which below will be called an egg-crate spacer. Such a spacer comprises a plurality of cells 10 of essentially square shape. Since the cells 10 have a squared shape, no further flow channels 32 of the kind which have been described above are formed in this kind of spacer. However, spaces are of course formed between the fuel rods 19 also in the kind of spacer which is shown in FIG. 3, in which spaces a cooling medium may flow.

In order to achieve a good cooling of the fuel rods is important that the cooling medium is conducted to the fuel rods in an efficient manner. The above described documents show different kinds of fins which are designed to conduct a cooling medium towards the fuel rods.

SUMMARY OF THE INVENTION

A purpose of the present invention is to achieve a spacer which in a more efficient manner contributes to directing a cooling medium towards the fuel rods. A further purpose is to achieve such a spacer with a relatively simple construction. Still another purpose is that the flow-influencing members which form part of the spacer shall have a relatively large flow directing surface without the necessity to make these flow-influencing members very large.

These purposes are achieved by a spacer of the kind which is described initially above and which is characterised in that said first edge surface extends from said second end of the cell and has an extension in at least said first direction and in that said second edge surface extends from that end of said first edge surface that is positioned upstream and has an extension in at least a direction which is perpendicular to said first direction.

Spacers according to the present invention thus have the advantage that the flow-influencing member, i.e. the fin, may be fabricated relatively simply since it forms a folded out part of the cell. Since the second edge surface, which is located upstream, has an extension perpendicularly to the flow direction, the folded out fin gets a relatively large flow directing area. It has in flow experiments appeared that the fin which forms part of the spacer according to the present invention contributes to an essentially improved cooling of the fuel rods.

According to a second aspect of the invention, the above mentioned purposes are achieved also by a spacer of the kind which is described initially above and which is characterised in that said first edge surface extends from said first end of the cell and has an extension in at least said first direction and in that said second edge surface extends from that end of said first edge surface that is positioned downstream and has an extension in at least a direction that is perpendicular to said first direction. According to this aspect of the invention, the same advantages are achieved as with the above described spacer. The difference is thus that the fin according to this second aspect of the invention extends from the end of the cell that is located upstream.

According to a third aspect of the invention, the above mentioned purposes are achieved by a spacer of the kind which is described initially above and which is characterised in that said first edge surface does not extend to said first end of the cell and does not extend to said second end of the cell and has an extension in at least said first direction and in that said second edge surface extends from that end of said first edge surface that is positioned upstream and has an extension in at least a direction which is perpendicular to said first direction. Also according to this aspect of the invention, the above-mentioned advantages are achieved since the second edge surface has an extension in a direction that is perpendicular to the flow direction. All the aspects of the invention are thus based on the idea that said second edge surface has an extension in a direction that is perpendicular to the flow direction, whereby a relatively large flow directing surface is achieved in the fin. This leads to an improved cooling of the fuel rods. The third aspect of the invention has the advantage that the spacer cell has a particularly rigid construction since the fin neither reaches to the first nor to the second end of the cell.

According to an advantageous embodiment of the invention, the folding line along which said flow-influencing member is folded out from said side portion is essentially straight and forms an angle of between 10° and 40°, preferably between 20° and 30°, with said first direction. It has appeared that the fin hereby gets an advantageous inclination relative to the flow direction such that an optimal influence on the flow of the cooling medium is achieved.

According to another advantageous embodiment of the invention, said flow-influencing member is folded out between 40° and 80°, preferably between 50° and 70°, from said side portion. It has appeared that since the flow-influencing member is folded out in this manner, an advantageous vortex is created in the flow of the cooling medium, which leads to an improved cooling of the fuel rods.

According to still another advantageous embodiment of the invention, said second edge of the flow-influencing member forms, when the flow-influencing member is folded out, an angle of between 70° and 110° with said first direction. Since said second edge in this manner is arranged more or less perpendicularly to the flow direction, the flow-influencing member gets a relatively large flow directing surface.

According to a further embodiment of the invention, said flow-influencing member is designed and arranged such that the whole flow-influencing member is positioned between said first and second end of the cell. The flow-influencing member is thereby positioned protected in the spacer. This means that there is no risk that the flow-influencing member is damaged, for example when fuel rods are exchanged.

According to still another embodiment of the invention, said first edge surface has a principal extension in a direction which forms an angle of between −40° and +40° with said first direction and said second edge surface has a principal extension in a direction which forms an angle of between 70° and 120° with said first direction. With such angles it is achieved that the folded out flow-influencing member has a flow-technically advantageous shape.

According to still another embodiment of the invention, said first and second edges are straight. Such a spacer is relatively simple to produce.

According to another embodiment of the invention, the spacer is of the kind where there are flow channels between said cells, in which flow channels a cooling medium may flow, wherein said flow-influencing member is folded into one of said flow channels. The spacer may thereby be of the kind which have sleeve-shaped cells or of the kind which is called a cell-spacer. With the invention it is achieved that the cooling medium which flows through these flow channels with an efficient manner is directed to the fuel rods for cooling the same.

According to a further embodiment of the invention, said flow channel defines an axis located centrally in the flow channel, which axis has an extension in said first direction, wherein said flow-influencing member is designed and arranged such that it reaches in to a position which is located at a distance from that side portion from which the flow-influencing member is folded out which constitutes between 50% and 90% of the distance between said side portion and said central axis. It is thereby achieved that the flow-influencing member has an optimal size. The flow-influencing member does not cause a too large pressure drop in the fuel assembly at the same time as the cooling medium in an efficient manner is conducted towards the fuel rods.

According to a further embodiment of the invention, a plurality of said flow-influencing members are positioned in each of at least a plurality of said flow channels. Thereby an improved control of the flow of the cooling medium in the direction towards the fuel rods is achieved.

According to still another embodiment of the invention, the spacer is of the kind which consists of an essentially square pattern, where essentially each cell is defined by four side portions which form a cell having a square form, which spacer does not include any further flow channels between said cells, wherein said flow-influencing member is arranged in a side portion close to a corner in the cell in question and is folded out into the cell. This kind of spacer is thus what is called an egg-crate spacer. In this kind of spacer there is a certain distance between the corners in the cell and a fuel rod that extends through the cell in question. This space may be used for arranging flow-influencing members.

According to a further embodiment of the invention, a plurality of said flow-influencing members are positioned in each of at least a plurality of said cells. For example, close to each corner, four flow-influencing members may be arranged in four different cells. In this manner, each cell may comprise one folded-in flow-influencing member in each corner, i.e. there are four flow-influencing members in each cell.

According to still another embodiment of the invention, said flow-influencing member has such an extension that it does not reach to that space that is intended to be occupied by a fuel rod when the spacer is arranged in a fuel assembly. The flow-influencing members do thus not exercise any supporting function for the fuel rods. Hereby a larger freedom is achieved in designing the flow-influencing members.

The purpose of the invention is also achieved by a fuel assembly for a nuclear light water reactor, which includes at least one spacer according to any one of the preceding embodiments.

SHORT DESCRIPTION OF THE DRAWINGS

The present invention will now be explained with the help of embodiments which are given as examples and with reference to the annexed drawings.

FIGS. 1, 2 and 3 show schematically different kinds of known spacers; FIGS. 1 and 2 show perspective views and FIG. 3 a view from above.

DETAILED DESCRIPTION OF EMBODIMENTS OF THE INVENTION

Figure 4:
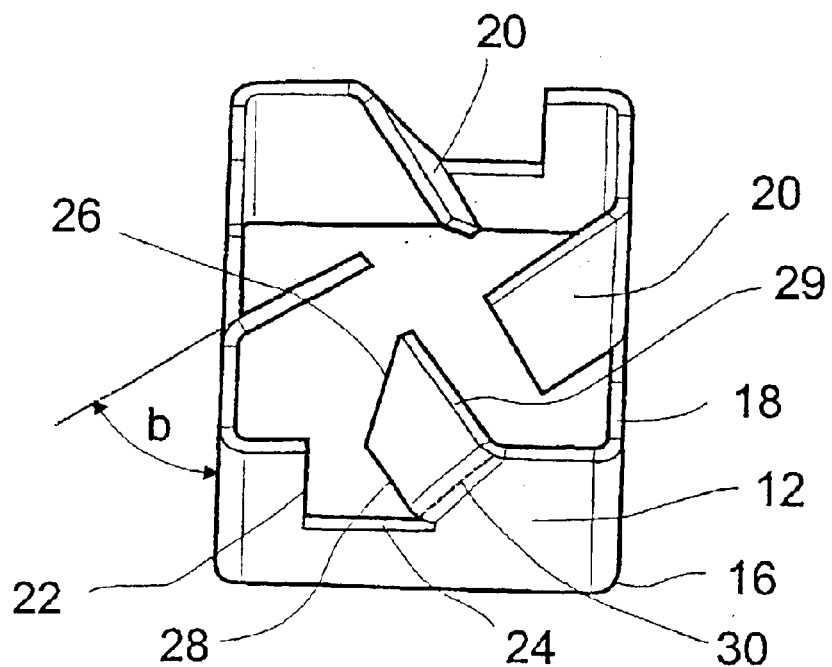
FIG. 4 shows schematically the principle of the invention with the help of a perspective view of a flow channel comprising four flow-influencing members.

FIGS. 1, 2 and 3 show different kinds of spacers which have been described above. All these kinds of spacers have a plurality of cells 10 for holding elongated elements, preferably fuel rods 19, in position in a fuel assembly for a nuclear reactor. A cell 10 is defined by a plurality of side portions 12. The cells extend in a first direction 14 which corresponds to the direction of flow of a cooling medium. The spacer and thereby each cell 10 comprises a first end 16 which is intended to be positioned downstream and a second end 18 which is intended to be positioned upstream. In FIGS. 1 and 2 no fuel rods are shown, but in FIG. 3 some fuel rods 19 are symbolically shown. In the kind of spacers which are shown in FIGS. 1 and 2, a plurality of flow channels 32 are formed between the cells 10. In these flow channels 32 there are thus no fuel rods. A cooling medium may thereby flow upwards through these flow channels 32. In the spacer according to FIG. 3 there are no such special flow channels 32, but there is a certain space between the fuel rods 19. In this space, a cooling medium may flow upwards.

FIGS. 1, 2 and 3 show known spacers. These spacers thus have no flow-influencing members 20 of the kind which form part of the spacer according to the present invention. The flow-influencing members 20, i.e. the fins, in a spacer according to the present invention may suitably be arranged in the upper part of the spacer. Thereby, controlled vortexes may be created in the flow of the cooling medium with the help of the fins 20 without these vortexes being disturbed by the structure of the spacer. As will be described below, it is however also possible that the fins are arranged further down in the spacer. However, next an embodiment will be described where the fins 20 are arranged in the upper part of the spacer. In for example the spacer according to FIG. 2 this means that the fins 20 are arranged in the upper band-shaped side portions 12 which enclose the cell 10 in question.

Figure 5:
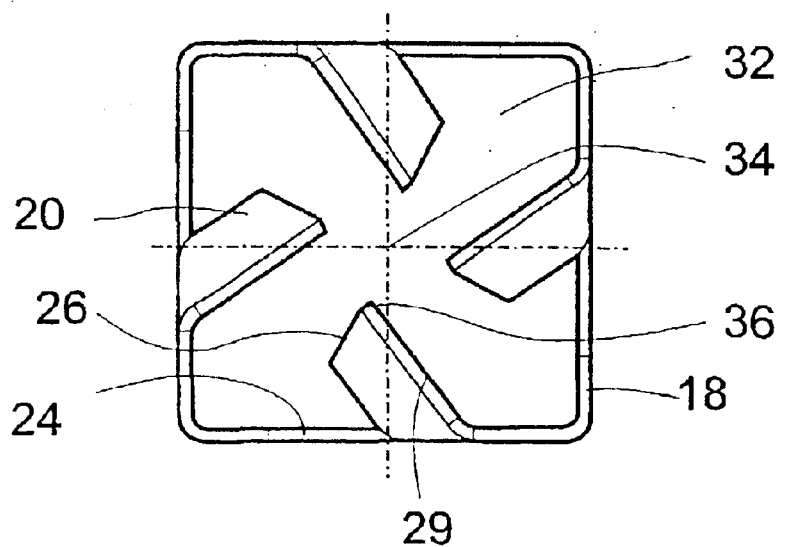
FIG. 5 shows a view from above of the device according to FIG. 4.
Figure 6:
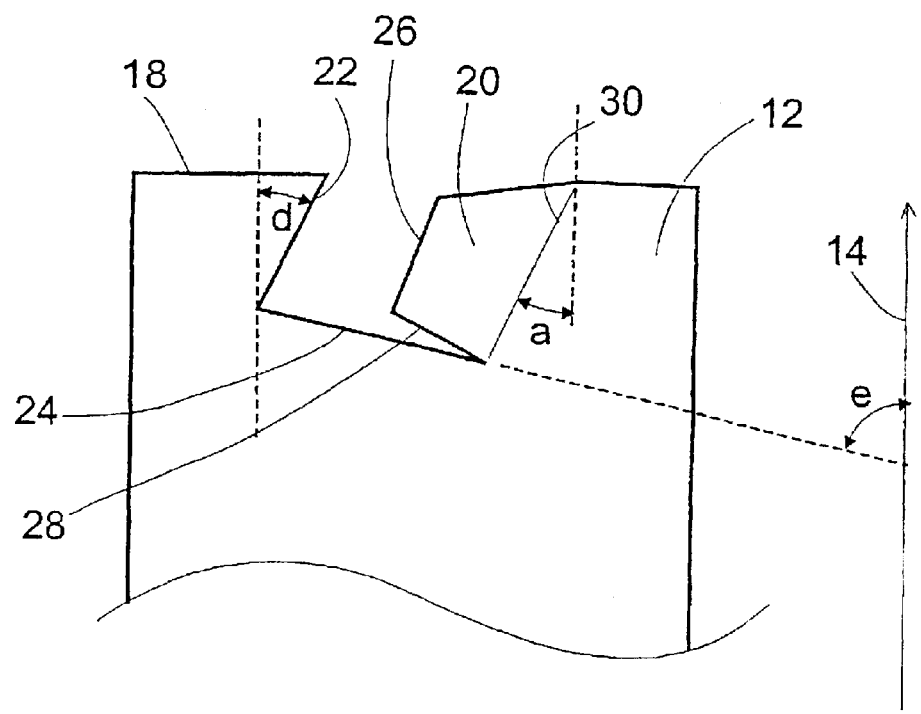
FIG. 6 shows schematically a side view of a side portion with a folded out flow-influencing member.

The invention will next be described primarily with reference to FIGS. 4, 5 and 6. FIGS. 4 and 5 show schematically a flow channel 32 that is formed in the kind of spacers which are shown in FIG. 1 and in FIG. 2. However, for the sake of simplicity, the flow channel 32 that is shown in FIGS. 4 and 5 have a purely square shape. FIG. 6 shows a side view of a side portion 12 with a flow-influencing member 20.

A side portion 12 of a cell 10 thus comprises a fin 20. The fin 20 is folded out from the side portion 12. In the shown case, the fin 20 is folded into the flow channel 32 along a folding line 30. The fin 20 is in this case folded such that it forms an angle b of about 60° with the side portion 12. It should be noted that in case the side portion 12 is bent, the angle b may be defined relative to a tangential plane to such a bent side portion 12.

The flow channel 32 defines an axis 34 positioned centrally in the flow channel 32. This central axis 34 thus extends perpendicular to the plane of the paper in FIG. 5. This central axis 34 is parallel to the direction 14 in which a cooling medium is intended to flow. This direction 14 is below also called a first direction 14. Usually the central axis 34 is vertically arranged in a fuel assembly.

In order to give the fin 20 a suitable inclination, the folding line 30 forms an angle a of preferably between 10° and 40°, most preferred between 20° and 30°, with said first direction 14.

This side portion 12 from which the fin 20 is folded out comprises a first 22 and a second 24 edge surface which are connected to each other but which have different directions of extension. These first 22 and second 24 edge surfaces correspond to a first 26 and a second 28 edge of the fin 20. If the fin 20 is folded back to the side portion 12, the fin 20 preferably fills the whole space that has been cut out from the side portion 12. It should however be noted that this does not necessarily have to be the case. For reasons based on the fabrication technique it is possible that a part of the fin 20 or of the side portion 12 is removed. However, it is the case that the directions of extension of the first 22 and the second 24 edge surfaces essentially correspond to the directions of extension of the first 26 and the second 28 edges of the fin 20 in a non-folded out state of the fin 20. In addition to the first edge 26 and the second edge 28, the fin 20 also has a third edge 29 which in this case is formed by the upper edge of the cell 10. It should be noted that it is the case for all the embodiments of the present invention that the folded out fin 20 has three such edges 26, 28 29. The edge 29 may, but does not need to, be parallel to the edge 28.

The first edge surface 22 of the side portion 12 extends from the second end 18 of the cell 10 and has an extension in said first direction 14. This means in the embodiments according to FIGS. 4 to 6 that this first edge surface 24 extends downwards. However, the first edge surface 22 does not need to be completely parallel to the first direction 14. As is shown in FIG. 6, the first edge surface 22 may also form an angle d with the first direction 14. This angle d may be between −40° and +40° relative to the first direction 14. Preferably, the angle of inclination d is between −20° and +20°. The angle d may of course be 0°. The second edge surface 24 extends from the end of the first edge surface 22 which is located upstream. The second edge surface 24 has an extension in a direction that is perpendicular to the first direction 14. As is shown in FIG. 6, the second edge surface 24 may form an angle e relative to the first direction 14, which angle e preferably is between 70° and 120°. According to an advantageous embodiment, this angle e is between 80° and 100°. The angle e may of course be exactly 90°.

The first 26 and the second 28 edges of the fin 20 are suitably straight. However, for the sake of flow technical reasons, the edges may also be somewhat bent. For example, the corner between the first edge 26 and the second edge 28 may be slightly rounded. Also the third edge 29 is according to a preferred embodiment essentially straight.

When the fin 20 is folded out, the second edge 28 of the fin 20 suitably forms an angle of between 70° and 110° with the first direction 14. Preferably, this angle may be essentially 90°, i.e. the second edge 28 is in this case essentially perpendicular to the direction of flow.

Furthermore, the fin 20 is suitably folded out in such a manner that the whole fin 20 is positioned between the first 16 and the second 18 ends of the cell 10. This means that the fin 20 does not protrude above the cell 10. The fin 20 is thereby positioned protected in the spacer.

Figure 10:
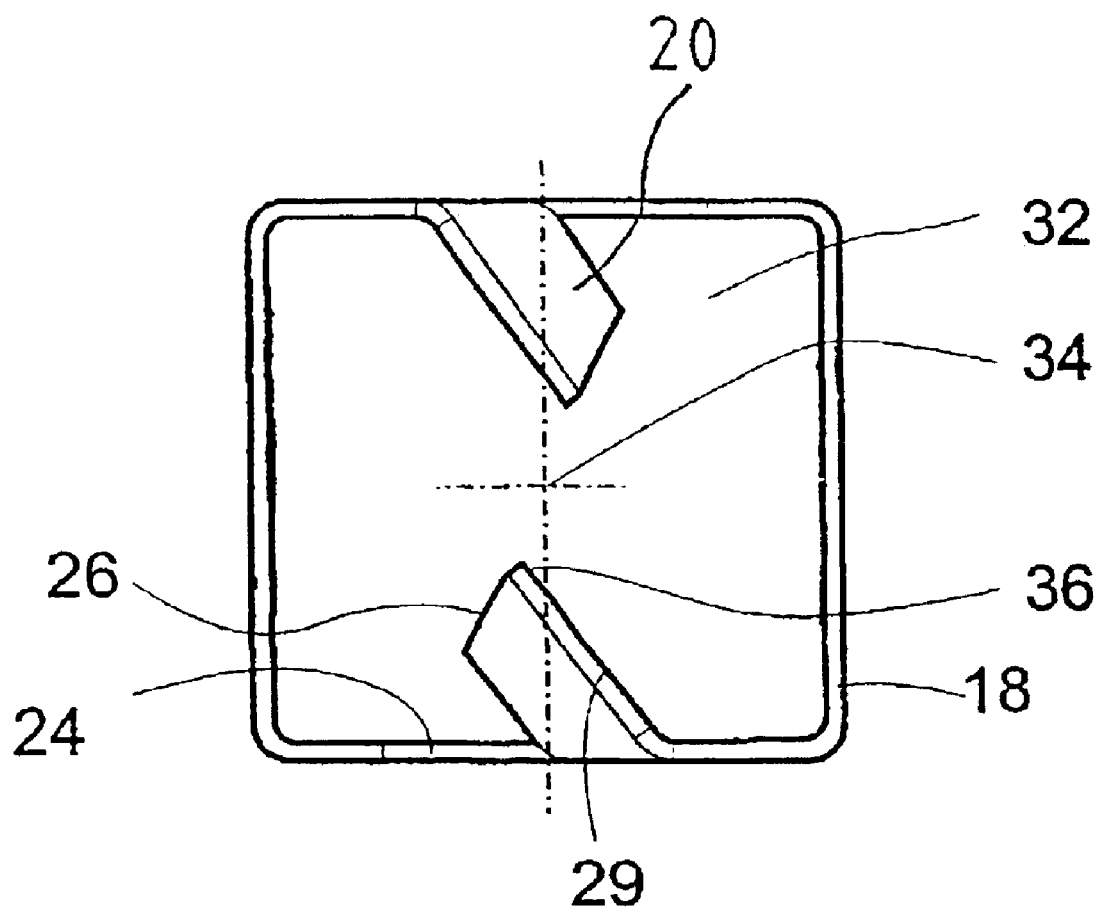
FIG. 10 shows a similar view as in FIG. 5 of a flow channel comprising two flow-influencing members.

The fin 20 suitably has such a size and is designed in such a manner that it reaches in to a position 36 which is located at a distance from the side portion 12 which forms between 50% and 90% of the distance between the side portion 12 and the central axis 34. According to a preferred embodiment, said distance is about 70% of the distance between the side portion 12 and the central axis 34. In order to achieve a well controlled vortex movement in the flow of the cooling medium, suitably a plurality of fins 20 are positioned in the flow channels 32. As is shown in FIGS. 4 and 5, suitably four fins 20 may be arranged per flow channel 32. FIG. 10 shows an example of a flow channel 32 where two fins 20 are arranged. Of course it is also possible that a different number of fins 20 are arranged in a flow channel 32. Thus, for example, three fins 20 or only one fin 20 may be arranged in a flow channel 32. Preferably, but not necessarily, the fins 20 are evenly distributed in the respective flow channel 32.

Figure 7:
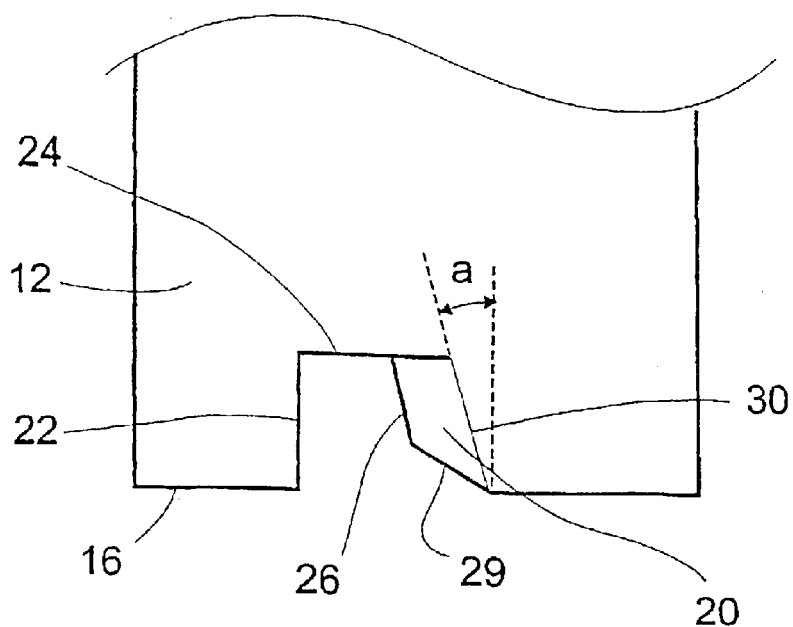
FIG. 7 shows schematically a similar view as FIG. 6 but where the flow-influencing member is arranged at the lower part of a spacer cell.

FIG. 7 shows an embodiment where the fin 20 is arranged in the bottom of the spacer. The first edge surface 22 thus extends from the first end 16 of the cell 10 and has an extension in said first direction 14. The second edge surface 24 extends from the end of the first edge surface 22 that is located downstream and has an extension in a direction that is perpendicular to the first direction 14.

Figure 8:
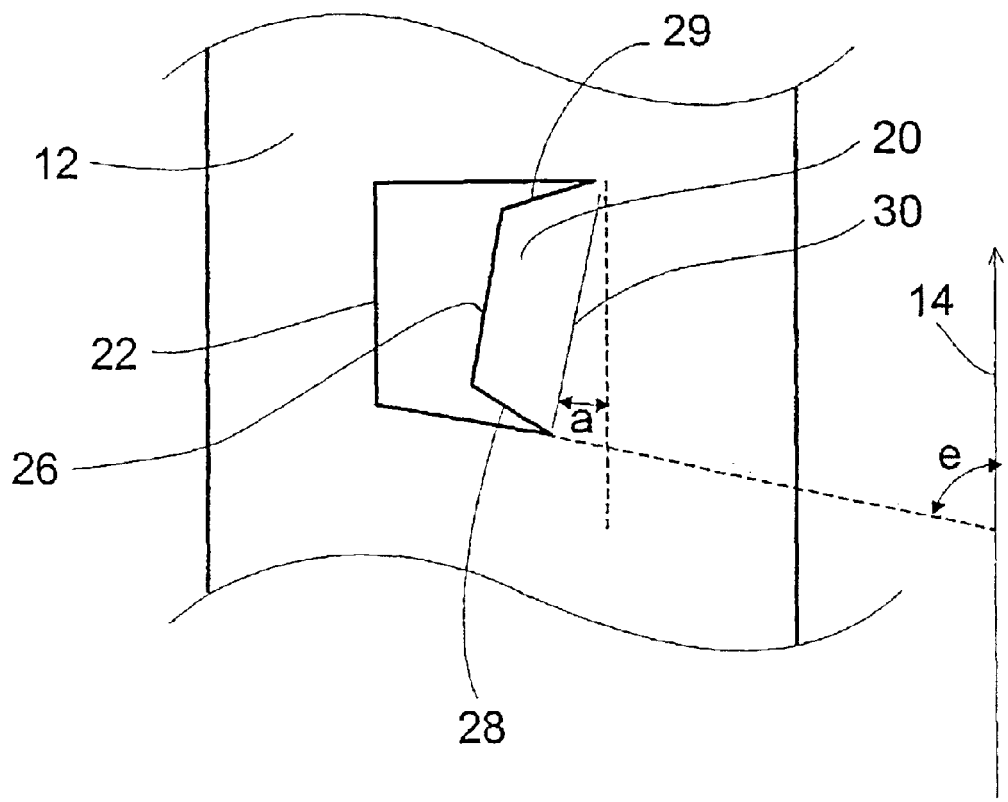
FIG. 8 shows schematically a similar view as FIGS. 6 and 7 but where the flow-influencing member is arranged between the upper and the lower ends of the spacer.

FIG. 8 shows another embodiment where the fin neither is arranged at the first 16 nor at the second 18 end of the cell 10. The first edge surface 22 does thus not reach to the first end 16 or to the second end 18. The first edge surface 22 has an extension in a first direction 14. The second edge surface 24 extends from the end of the first edge surface 22 that is located upstream and has an extension in a direction that is perpendicular to the first direction 14. Also according to this embodiment, the fin 20 comprises a third edge 29.

The above mentioned alternative embodiments concerning for example different angles are of course also applicable to the embodiments according to FIG. 7 and FIG. 8.

Figure 9:
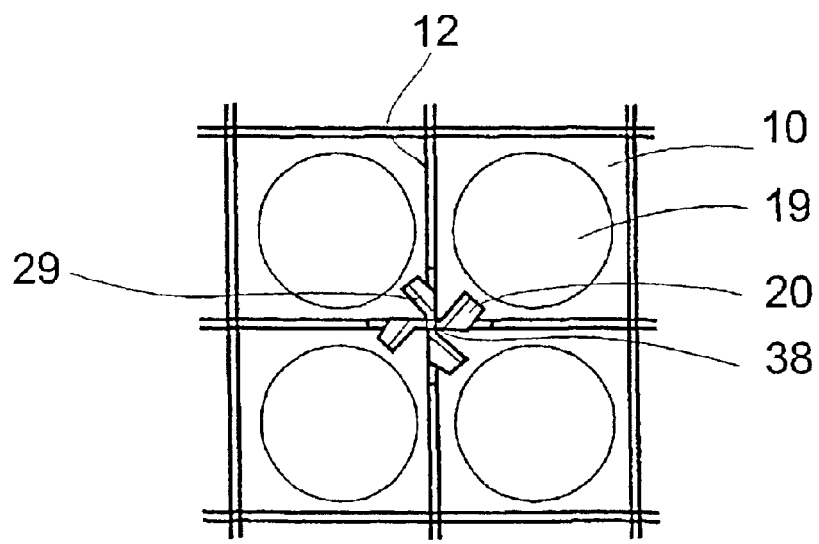
FIG. 9 shows schematically a view from above of a part of a spacer of the egg-crate kind.

FIG. 9 shows schematically an embodiment that is suited for a spacer of the kind that is shown in FIG. 3. The fin is here arranged in a side portion 12 near a corner 38 in a cell 10. The fin 20 is in this case folded out into the cell 10, i.e. in a direction towards a fuel rod 19. Also in this case, each cell 10 suitably comprises a plurality of fins 20. Suitably, four fins 20 may be arranged next to each corner 38. This means that each cell may comprise four fins 20. For the sake of simplicity fins 20 are only shown at one of the corners 38 in FIG. 9. Concerning angles and inclinations also the embodiment according to FIG. 9 may be varied in the manner that has been described above. As can be seen in FIG. 9, the fins 20 do not reach all the way in to the fuel rods 19. The fins 20 do thus not exercise any supporting function for the fuel rods 19. The fins 20 are thus only intended to influence the flow of the cooling medium through the fuel assembly.

Figure 11:
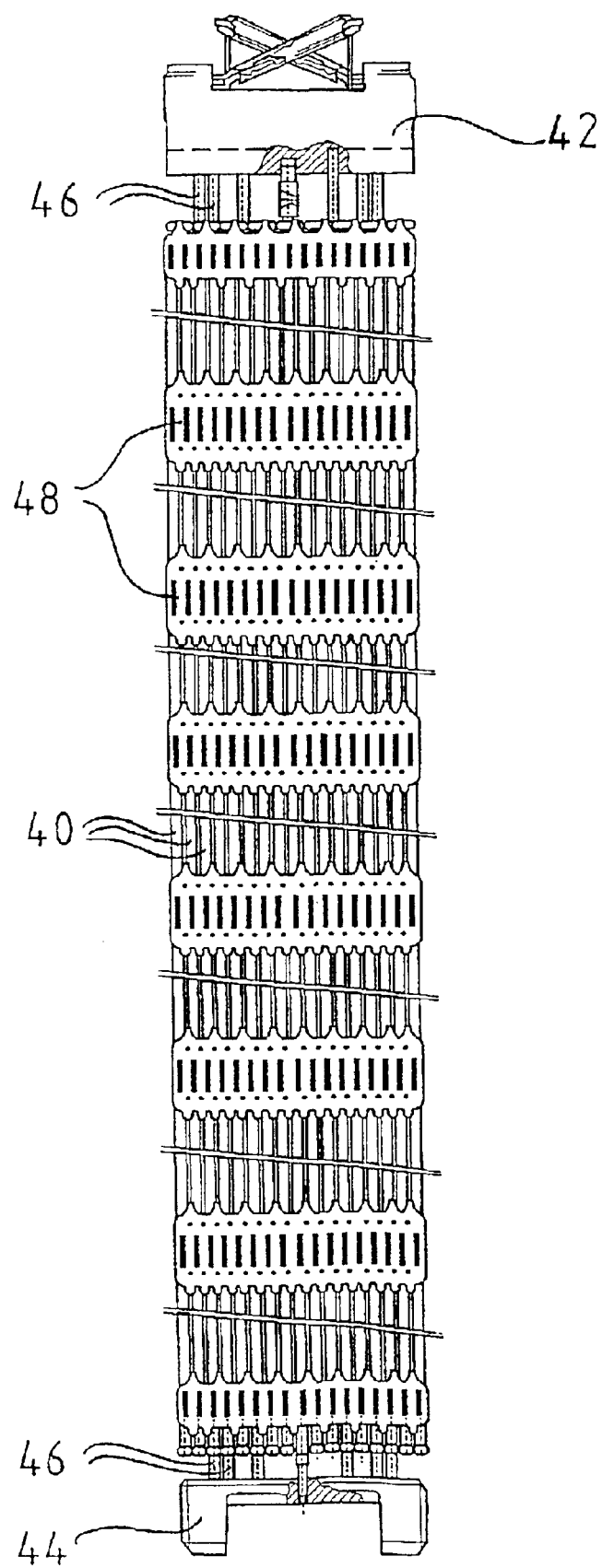
FIG. 11 shows schematically a side view of a fuel assembly for a pressure water reactor.

FIG. 11 shows schematically a fuel assembly according to the present invention for a pressure water reactor. Such a fuel assembly comprises usually a first support plate 42 and a second support plate 44. The fuel assembly comprises a plurality of fuel rods 40. The fuel assembly is usually held together with the help of a number of guide tubes 46 for control rods and with the help of a plurality of spacers 48. According to the present invention, at least one of these spacers 48 is designed in accordance with any of the above embodiments.

Figure 12:
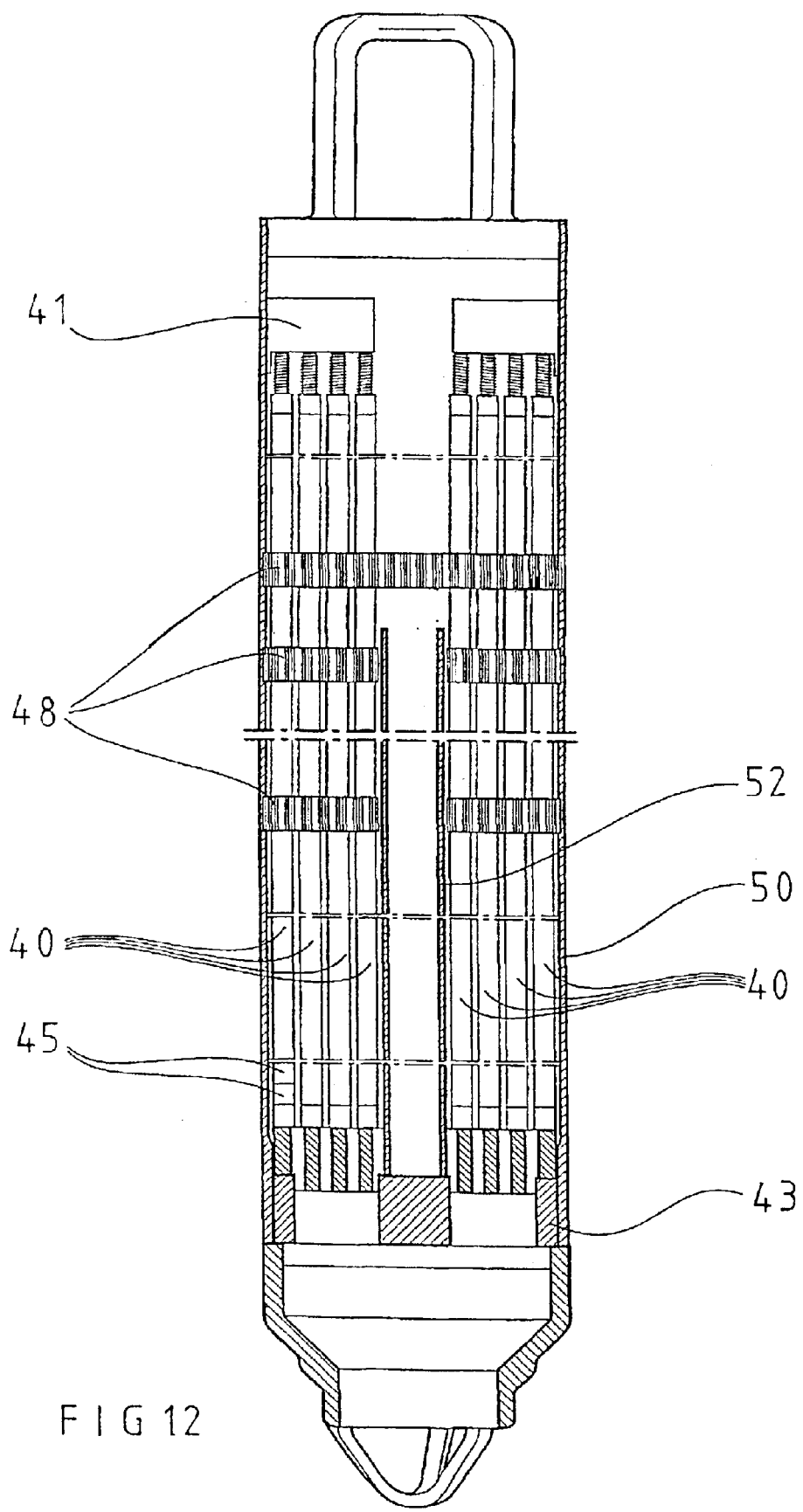
FIG. 12 shows schematically a sectional view of a fuel assembly for a boiling water reactor.

FIG. 12 shows schematically a fuel assembly for a boiling water reactor. Such a fuel assembly usually comprises a top plate 41 and a bottom plate 43 between which a number of fuel rods 40 are arranged. The fuel rods 40 usually comprise a number of pellets 45 of nuclear fuel material. Furthermore, the fuel assembly usually comprises a casing tube 50 as well as one or more water channels 52. The fuel assembly also comprises a number of spacers 48 which hold the fuel rod 40 in defined positions. According to the present invention, at least one of the spacers 48 is designed in accordance with any of the above described embodiments. For both a pressure water reactor and a boiling water reactor it is of course the case that a plurality of spacers 48 or even all the spacers 48 may be designed in accordance with the present invention.

It should be noted that the fins 20 according to the present invention are not intended to support the fuel rods 19 when the spacer in question is arranged in position in a fuel assembly for a nuclear reactor. In the kind of spacer that is shown in FIG. 1 and FIG. 2, the fins 20 will in reality be directed into the flow channels which are formed between the fuel rods 19. In the kind of spacer that is shown in FIG. 3, the fins 20 (see FIG. 9) will be directed in towards the fuel rods 19. The fins 20 do, however, not reach all the way to the fuel rods 19. Hereby a large freedom is achieved in the exact design of the fins 20. In this way, the fins 20 may be designed to have an optimal flow-influencing function. Of course, the spacers according to the different embodiments suitably comprise other members, for example resilient members, for holding the fuel rods 19 in position relative to the spacer and thereby relative to each other. Such holding members are well known to the person skilled in the art.

The present invention is not limited to the shown embodiments may be varied and modified within the scope of the following claims.

What is claimed is :

1. A fuel assembly for a nuclear light water reactor, comprising a plurality of fuel rods (19, 40) which constitute parallel elongated elements, and at least one spacer, which is designed such that it forms a plurality of cells (10) for holding at least said parallel elongated elements which are arranged such that they extend through the cells or for allowing these elements to pass through the cells, wherein each of said cells (10) is defined by a plurality of side portions (12) which together surrounds one of said elongated elements when such an element is arranged such that it extends through the spacer, wherein the spacer is arranged in said fuel assembly such that said cells (10), and thereby said elongated elements, extend in essentially a first direction (14) in which a cooling medium is intended to flow, wherein each cell (10) thus comprises a first end (16) which is intended to be positioned upstream with regard to said first direction (14) and a second end (18) which is intended to be positioned downstream with regard to said first direction (14), wherein for at least one of said cells (10) it is the case that at least one of said side portions (12) which define the cell (10) comprises at least one flow-influencing member (20) which is formed by a part of said side portion (12) and which is folded out from the side portion (12) along a folding line (30) that is essentially straight and forms an angle (a) of between 10° and 40° with said first direction (14), said flow-influencing member being folded out between 40° and 80° from said side portion (12), wherein said side portion (12) from which said flow-influencing member (20) is folded out comprises a first (22) and a second (24) edge surface which are connected to each other, which edge surfaces (22, 24) have different principal directions of extension which correspond to the directions of a first (26) and a second (28) edge of said flow-influencing member (20) in a non folded out state of the flow-influencing member (20), characterised in that said first edge surface (22) extends from said second end (18) of the cell (10) and has an extension in at least said first direction (14), in that said second edge surface (24) extends from that end of said first edge surface (22) that is positioned upstream and has an extension in at least a direction which is perpendicular to said first direction (14), and that said flow-influencing member (20) has such an extension that it does not reach to said fuel rods (19, 40), wherein said flow-influencing member (20) is designed and arranged such that the whole flow-influencing member (20) is positioned between said first (16) and second end (18) of the cell (10).

2. A fuel assembly according to claim 1, characterized in that said folding line (30) forms an angle (a) of between 20° and 30° with said first direction (14).

3. A fuel assembly according to claim 1, characterised in that said flow-influencing member (20) is folded out between 50° and 70° from said side portion (12).

4. A fuel assembly according to claim 1, characterised in that said second edge (28) of the flow-influencing member (20) forms, when the flow-influencing member (20) is folded out, an angle of between 70° and 110° with said first direction (14).

5. A fuel assembly according to claim 1, characterised in that said first edge surface (22) has a principal extension in a direction which forms an angle (d) of between −40° and +40° with said first direction (14) and that said second edge surface (24) has a principal extension in a direction which forms an angle (e) of between 70° and 120° with said first direction (14).

6. A fuel assembly according to claim 1, characterised in that said first (26) and second (28) edges are straight.

7. A fuel assembly according to claim 1, characterised in that the spacer is of the kind where there are flow channels (32) between said cells (10), in which flow channels (32) a cooling medium may flow, wherein said flow-influencing member (20) is folded into one of said flow channels (32).

8. A fuel assembly according to claim 7, characterised in that said flow channel (32) defines an axis (34) located centrally in the flow channel (32), which axis has an extension in said first direction (14), wherein said flow-influencing member (20) is designed and arranged such that it reaches in to a position (36) which is located at a distance from that side portion (12) from which the flow-influencing member (20) is folded out which constitutes between 50% and 90% of the distance between said side portion (12) and said central axis (34).

9. A fuel assembly according to claim 7, characterised in that a plurality of said flow-influencing members (20) are positioned in each of at least a plurality of said flow channels (32).

10. A fuel assembly according to claim 1, characterised in that the spacer is of the kind which consists of an essentially square pattern, where essentially each cell (10) is defined by four side portions (12) which form a cell (10) having a square form, which spacer does not include any further flow channels between said cells (10), wherein said flow-influencing member (20) is arranged in a side portion (12) close to a corner (38) in the cell (10) in question and is folded out into the cell (10).

11. A fuel assembly according to claim 10, characterised in that a plurality of said flow-influencing members (20) are positioned in each of at least a plurality of said cells (10).

* * * * *